US010632999B2

(12) United States Patent
Thyagarajan et al.

(10) Patent No.: US 10,632,999 B2
(45) Date of Patent: Apr. 28, 2020

(54) OBSERVER BASED LOAD POWER ESTIMATION METHOD FOR HYBRID ELECTRIC VEHICLES

(71) Applicant: Deere & Company, Moline, IL (US)

(72) Inventors: Lav Thyagarajan, West Fargo, ND (US); Jacob Decock, West Fargo, ND (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 16/106,273

(22) Filed: Aug. 21, 2018

(65) Prior Publication Data
US 2020/0062260 A1 Feb. 27, 2020

(51) Int. Cl.
*B60W 30/188* (2012.01)
*B60W 10/08* (2006.01)
*B60W 20/15* (2016.01)
*B60W 50/00* (2006.01)

(52) U.S. Cl.
CPC ........ *B60W 30/1886* (2013.01); *B60W 10/08* (2013.01); *B60W 20/15* (2016.01); *B60W 2050/0012* (2013.01); *B60W 2050/0045* (2013.01); *B60W 2300/12* (2013.01); *B60W 2300/15* (2013.01); *B60W 2400/00* (2013.01); *B60W 2510/305* (2013.01); *B60W 2710/305* (2013.01)

(58) Field of Classification Search
CPC .. B60W 30/1886; B60W 20/15; B60W 10/08; B60W 2050/0012; B60W 2050/0045; B60W 2300/12; B60W 2300/15; B60W 2510/305; B60W 2710/305; H02P 23/14; H02P 27/08
See application file for complete search history.

(56) References Cited

U.S. PATENT DOCUMENTS

| 5,631,813 A | 5/1997 | Ikeshita |
| 2005/0052144 A1 | 3/2005 | Matsubara et al. |
| 2013/0229135 A1 | 9/2013 | Long et al. |

(Continued)

OTHER PUBLICATIONS

"Design of dc link current observer for a 3-phase active rectifier with feedforward control," Conference Record of the 2004 IEEE Industry Applications Conference, 2004. 39th IAS Annual Meeting., Seattle, WA, USA, 2004, pp. 468 vol. 1 (Year: 2004).*

(Continued)

*Primary Examiner* — Jeffrey A Gblende
*Assistant Examiner* — Jye-June Lee
(74) *Attorney, Agent, or Firm* — Harness, Dickey & Pierce, P.L.C.

(57) ABSTRACT

A method of operating a hybrid electric vehicle includes driving an engine to generate mechanical energy, converting the mechanical energy into a first AC voltage, estimating a total DC link current associated with a respective plurality of loads of the hybrid electric vehicle, converting, with a first inverter, the first AC voltage into a DC bus voltage by regulating the DC bus voltage based on the total DC link current, and inverting, with a respective plurality of inverters, the DC bus voltage into a respective plurality of other AC voltages to drive the respective plurality of loads on the hybrid electric vehicle.

18 Claims, 5 Drawing Sheets

(56) References Cited

U.S. PATENT DOCUMENTS

| | | | |
|---|---|---|---|
| 2014/0008977 A1* | 1/2014 | Koukkari | H02J 4/00 |
| | | | 307/23 |
| 2014/0306638 A1 | 10/2014 | Wu et al. | |
| 2017/0149364 A1 | 5/2017 | Wu et al. | |
| 2018/0062547 A1 | 3/2018 | Dutta et al. | |
| 2018/0145621 A1 | 5/2018 | Aliprantis et al. | |
| 2018/0342970 A1* | 11/2018 | Kim | H02P 23/14 |
| 2018/0345952 A1* | 12/2018 | Layfield | B60W 10/08 |

OTHER PUBLICATIONS

European Search Report dated Feb. 26, 2020 issued in European Patent Application No. 19192888.6-1205.

* cited by examiner

OBSERVER BASED LOAD POWER ESTIMATION METHOD FOR HYBRID ELECTRIC VEHICLES

FIELD

Example embodiments relate to systems and methods for operating and controlling hybrid electric machines and, more specifically, enabling observer based load power estimation to improve the performance of voltage control for generator based applications.

BACKGROUND

Hybrid electric vehicles have become much more widespread over the last decade, going from a niche solution to an established technology. The limits of electrification are being explored enthusiastically in industry, with electric motors and actuators being prototyped and perfected in on-road vehicles such as cars and trucks, as well as off-road vehicles such as farming, construction, and mining equipment. Once known almost exclusively for their fuel saving advantage over combustion only solutions, hybrid electric vehicles are now also recognized for their improved performance. The resulting abundance of electrical energy on vehicles has opened up new opportunities for improved performance by replacing slower and less efficient hydraulic and mechanical systems with faster, quieter, tighter controlled, and more efficient electric machines and actuators.

Two forms dominate the hybrid electric vehicle market: parallel and series hybrids. The topology of a parallel hybrid is such that motion can be achieved through sole use of an engine, sole use of an electric motor, or combined use of both an engine and an electric motor. In a series hybrid, an engine is used to spin an electric machine that generates electricity, which (with power electronics) can then be used by a second electric machine to provide motion. The series hybrid topology allows elimination of the transmission from the vehicle, improving efficiency and smoothness of operation as well as reduction in complexity and audible noise. Both the series and parallel hybrids often also have batteries in the system for electrical energy storage.

Hybrid electric systems are operated through the use of power electronics typically referred to as inverters (or converters). Control loops are a critical part of the inverters in known systems, allowing commands for torque, speed, and voltage to be satisfied. Furthermore, the accuracy and responsiveness of these control loops are an important part of what gives electrification an edge over its more seasoned hydraulic and mechanical counterparts. To achieve this higher level of performance in known systems, robust control schemes must be utilized. Additionally, commercialization of these systems requires cost reduction, which can be accomplished through sensor replacement methodologies (observers).

Traditional voltage controllers are often constructed with only proportional and integral control. This topology is prone to poor dynamic performance and disturbance rejection.

SUMMARY

Electric drive systems often contain controllers with the objective of providing a stable voltage source for use by power electronics. In a dynamic environment, maintaining this stable source can prove challenging. Various enhancements can be made to traditional control methods to improve the stability of the energy sources in these systems.

At least one example embodiment provides, with system modeling, active state feedback, observers, and disturbance input decoupling, significant performance improvements in electric drive systems. More specifically, inventive concepts provide inverter DC bus voltage control of electric machines, as used for example in series hybrid system topologies, that provides performance improvements realized with DC bus voltage observers.

At least one example embodiment provides a method of operating a hybrid electric vehicle. includes driving an engine to generate mechanical energy, converting the mechanical energy into a first AC voltage, estimating a total DC link current associated with a respective plurality of loads of the hybrid electric vehicle, converting, with a first inverter, the first AC voltage into a DC bus voltage by regulating the DC bus voltage based on the total DC link current, and inverting, with a respective plurality of inverters, the DC bus voltage into a respective plurality of other AC voltages to drive the respective plurality of loads on the hybrid electric vehicle.

In an example embodiment, the estimating the total DC link load current includes estimating the total DC link load current associated with the respective plurality of loads without estimating the total DC link load current based on information associated with the respective plurality of loads fed forward from each of the respective plurality of inverters to the first inverter.

An example embodiment may further include at least one of measuring the DC bus voltage to determine a measured DC bus voltage, and estimating the DC bus voltage to determine an estimated DC bus voltage An example embodiment may further include estimating a total load power of the hybrid electric vehicle based on the estimated total DC link load current and at least one of the measured DC bus voltage and the estimated DC voltage. The regulating the Dc bus voltage includes regulating the DC voltage based on the estimated total load power, In an example embodiment, at least one of the plurality of other AC voltages includes a three-phase voltage.

In an example embodiment, the estimating includes estimating the total DC link load current based on a measured first AC current, a measured second AC current, and a measured third AC current, wherein each of the first AC current, the second AC current, and the third AC current correspond to the first AC voltage.

In an example embodiment, inverting the DC bus voltage into a respective plurality of other AC voltages includes driving a wheel on the hybrid electric vehicle.

In an example embodiment, inverting the DC bus voltage into a respective plurality of other AC voltages includes driving a trailer assist attached to the hybrid electric vehicle.

In an example embodiment, the method may include estimating a change in DC bus voltage with respect to time, controlling, with a current command, the DC link current based on the estimated change in DC bus voltage with respect to time, and reducing the change in DC bus voltage with respect to time based on the current command.

At least one example embodiment provides a hybrid electric vehicle comprising an engine configured to generate mechanical energy, a generator configured to convert the mechanical energy into a first AC voltage, a first inverter configured to convert the first AC voltage into a DC bus voltage, a plurality of inverters configured to invert the DC bus voltage into a respective plurality of other AC voltages, a respective plurality of motors configured to convert the respective plurality of other AC voltages to drive a respective plurality of loads, and an observer to estimate a total DC link load current associated with the respective plurality of loads. The first inverter is configured to regulate the DC bus voltage based on the total DC link load current.

In an example embodiment, the observer is configured to estimate a total load power associated with the plurality of loads.

In an example embodiment, the plurality of loads includes a wheel.

In an example embodiment, the plurality of loads includes a trailer assist.

In an example embodiment, each of the plurality of inverters are not connected to the first inverter through a communication network.

At least one example embodiment includes an inverter-observer for a hybrid electric vehicle. a voltage controller configured to regulate a DC bus voltage based on a total power associated with a plurality of loads on the hybrid electric vehicle, a memory configured to store non-transitory computer readable instructions, and a processor. The processor is configured to execute the non-transitory computer readable instructions stored in the memory to receive an estimated first link current associated with a generator of the hybrid electric vehicle, estimate a total DC link load current associated with the plurality of loads on the hybrid electric vehicle, and determine the total power associated with the plurality of loads on the hybrid electric vehicle.

In an example embodiment, the processor is further configured to estimate the total load power based on an estimated total DC link load current and at least one of an estimated DC bus voltage and a measured voltage associated with the regulated DC bus voltage, the total load power being associated with loads on the hybrid electric vehicle. The voltage controller is configured regulate the DC bus voltage based on the total load power.

In an example embodiment, the voltage controller is configured to regulate the DC bus voltage to drive a farm equipment.

In an example embodiment, the processor is configured to execute machine readable instructions to estimate the total DC link load current based on a measured first AC current, a measured second AC current, and a measured third AC current. Each of the first AC current, the second AC current, and the third AC current are associated with a generator on the hybrid electric vehicle.

In an example embodiment, the processor is configured to execute the computer readable instructions to determine the total power based on at least one of primary feedforward data or secondary feedforward data, wherein, depending on an inductance of a load associated with the inverter-observer, the primary feedforward data includes at least one of a measured DC link voltage associated with the hybrid electric vehicle, an estimated DC link voltage associated with the hybrid electric vehicle, a time derivative of the measured DC link voltage associated with the hybrid electric vehicle, a time derivative of the estimated DC link voltage associated with the hybrid electric vehicle, an observed DC link current associated with the hybrid electric vehicle, or an estimated DC link current associated with the hybrid electric vehicle. The secondary feedforward data includes at least one of observed torque associated with the hybrid electric vehicle, or commanded torque associated with the hybrid electric vehicle

BRIEF DESCRIPTION OF THE DRAWINGS

Example embodiments will be more clearly understood from the following detailed description taken in conjunction with the accompanying drawings.

FIG. 1 is an example series hybrid block diagram including a voltage observer, according to example embodiment;

FIG. 2 is state block diagram of a motor DC voltage control including a voltage state feedback observer and a disturbance input decoupling observer, according to an example embodiment;

FIG. 3 is a state block diagram of a voltage controller and observer topology according to example embodiments;

FIG. 4 is an example physical system setup, according to example embodiments; and FIG. 5 is an example of a method of operating a series hybrid electric vehicle, according to example embodiments.

DETAILED DESCRIPTION

Figure 1:
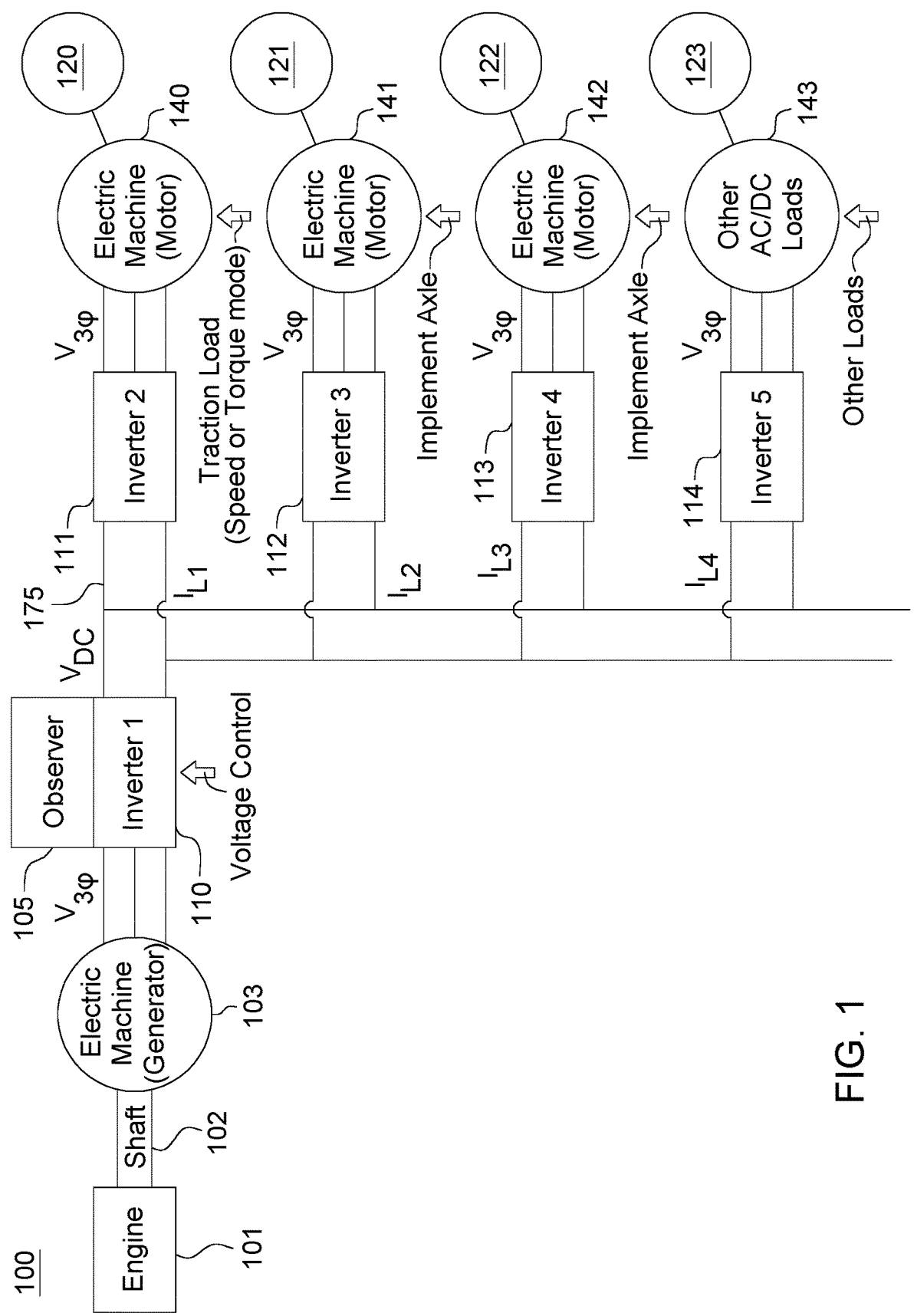
FIGS. 1-5 represent non-limiting, example embodiments as described herein.

Some example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware. Such existing hardware may include one or more Central Processing Units (CPUs), Digital Signal Processors (DSPs), Application-Specific-Integrated-Circuits (ASICs), Field Programmable Gate Arrays (FPGAs), computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits.

Further, at least one embodiment of the invention relates to a non-transitory computer-readable storage medium comprising electronically readable control information stored thereon, configured such that when the storage medium is used in a controller of a motor system, at least one embodiment of the method is carried out.

Even further, any of the aforementioned methods may be embodied in the form of a program. The program may be stored on a non-transitory computer readable medium and is adapted to perform any one of the aforementioned methods when run on a computer device (a device including a processor). Thus, the non-transitory, tangible computer readable medium is adapted to store information and is adapted to interact with a data processing facility or computer device to execute the program of any of the above-mentioned embodiments and/or to perform the method of any of the above-mentioned embodiments.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

DC voltage control is a common feature for motor drives used in hybrid electric vehicles and other systems that use electric machines as generators. In a series electric hybrid the DC bus is created by spinning an electric machine (generator) with an engine and converting this mechanical energy to electrical energy through power electronics. The electrical energy can then be consumed by an additional electric machine (motor) to propel the vehicle or provide some other useful function. In this type of system, it is important that the DC voltage between the power electronics (typically referred to as DC bus voltage) remain at the desired level. Failure to sustain a desired voltage level may result in loss of DC link voltage control and/or poor performance. For example, derating may occur to prevent DC link loss; however, this reduces performance. Furthermore, an inverter may require overvoltage protection. Therefore, high performance DC bus voltage control is important to this type of system. FIG. 1 illustrates an example of a hybrid-electric vehicle with a series topology, according to example embodiments.

Referring to FIG. 1, a hybrid electric vehicle 100 includes an engine 101, a shaft 102 connected to the engine 101, a generator 103 connected to the shaft 102, an inverter 110 connected to the generator 103, an observer 105 connected to an inverter 111, and a respective plurality of motors 140, 141, 142, 143 connected to a respective plurality of inverters 111, 112, 113, 114. The hybrid electric vehicle may include a plurality of loads 120, 121, 122, 123 connected to the respective plurality of motors 140, 141, 142, 143

Although four motors and four loads are illustrated in FIG. 1, inventive concepts are not limited thereto. For example, there may be more than four motors and four loads, or there may be less than four motors and four loads.

The engine 101 converts fuel into mechanical energy. For example, the engine 101 may be or include an internal combustion engine. The engine 101 drives the shaft 102. The shaft 102 mechanically moves in response to revolutions of the engine 101.

The generator 103 converts mechanical energy from the engine 101 into electric energy. The generator 103 generates a voltage in response to mechanical movement of the shaft 102. In an example embodiment, the voltage generated by the generator 103 may be an AC voltage. Further, the voltage generated by the generator 103 may be a three-phase AC voltage.

The voltage generated by the generator 103 is supplied to the inverter 110. The inverter 110 converts the AC voltage into a DC bus voltage on a DC bus 175. For example, the inverter 110 may include a rectifier (not shown), and the rectifier may rectify the AC voltage into the DC bus voltage to supply on the DC bus 175. In an example embodiment, the inverter is actively controlled as a rectifier.

In a hybrid electric vehicle system, data may be fed forward from loads to inverters. Primary feedforward data may include at least one of a measured DC link voltage, a (time) derivative of the measured DC link voltage, an estimated DC link voltage, a (time) derivative of the estimated DC link voltage, etc. Similarly, primary feedforward data may include at least one of a measured DC link current, observed DC link current, and an estimated DC link current. The relation between current and voltage may be dependent upon or accounting for the impedance, e.g. the inductance, of loads. Secondary feedforward data includes torque command data, such as observed or commanded torque data.

The primary feedforward data and the secondary feedforward data may be provided by one or more observers. For example, the observer 105 is or includes an inverter data processing system that provides primary feedforward data, secondary feedforward data, or both primary and secondary feedforward data.

The observer 105 estimates a load power, which is used to augment an output voltage on the DC bus. Details of the operation of the observer 105 are discussed in more detail below, in reference to FIGS. 2-5.

The inverter 110 supplies the DC bus voltage on the DC bus 175 to the plurality of inverters 111, 112, 113, 114. At least one of the plurality of inverters 111, 112, 113, and 114 may be an inverter that is external to inverter 110.

The plurality of inverters 111, 112, 113, 114, invert the DC bus voltage on the DC bus 175 into a plurality of respective other AC voltages. At least one of the plurality of other AC voltages may be a three-phase voltage.

The plurality of AC voltages are then be supplied to the respective plurality of motors 140, 141, 142, 143. Based on the plurality of other AC voltages, the plurality motors 140, 141, 142, 143 drive the respective plurality of loads 120, 121, 122, 123.

One of the respective plurality of loads may include a wheel on the hybrid electric vehicle 100. For example, one of the plurality of motors 140, 141, 142, 143 may rotate at least one wheel on the hybrid electric vehicle 100. One of the respective plurality of loads 120, 121, 122, 123 may include a trailer assist. For example, one of the plurality of motors 140, 141, 142, 143 may rotate wheels on a trailer assist. The trailer assist may be a part of the hybrid electric vehicle 100, or the trailer assist may be external to the hybrid electric vehicle 100. Example embodiments of the load may include farm equipment, construction equipment such as heavy machinery, and the like. One of the respective plurality of loads 120, 121, 122, 123 may include a farm equipment. One or more of the loads may be a part of the hybrid electric vehicle 100, or one or more of the loads may be external to the hybrid electric vehicle 100.

One of the respective plurality of loads may correspond to a power break on the hybrid electric vehicle 100. The hybrid electric vehicle 100 may engage in regenerative breaking, wherein energy from a break on the hybrid electric vehicle 100 is used to charge a battery on the hybrid electric vehicle 100.

With conventional hybrid electric vehicle technology, there may be a feedforward path, or communication path, between a plurality of loads and an inverter that converts an AC voltage into a DC bus voltage. For example, there may be a plurality external inverters that provide AC voltage to a plurality of loads. There may be at least one of a controller area network, an Ethernet, an Ethercat, a communication access network (CAN) connection, etc. between the plurality of inverters and an inverter connected to a generator. The plurality of inverters may provide a DC link load current associated with respective loads to the inverter connected to the generator. Based on the DC link load current, a voltage controller on the inverter connected to the generator may help to regulate the DC bus voltage. Depending on the speed of the communication, there may be a lag in regulation.

However, according to example embodiments, the inverters 111, 112, 113, 114 may not supply DC link load currents or power associated with the plurality of loads 120, 121, 122, 123 to the first inverter 110. There may not be a communication path from the inverters 111, 112, 113, 114 to the inverter 110. For example, there may not be at least one of a controller area network, an Ethernet, an Ethercat, a communication access network (CAN) connection, etc. communication access network connected between the inverters 111, 112, 113, 114 and the inverter 110. Instead of providing DC link load currents associated with the plurality other loads 120, 121, 122, 123, the observer 105 may determine a total estimated DC link current associated with the plurality of loads 120, 121, 122, 123. By estimating a total value of the DC link load current and power and by regulating the DC bus voltage on the DC bus 175 based on the estimation, there may be a reduction in lag in regulation, and/or an improved dynamic performance. Furthermore, the observer 105 may estimate a total electric power supplied to the plurality of loads 120, 121, 122, 123.

Furthermore with conventional hybrid electric vehicles, an inverter may require a physical capacitor having a large capacitance, in order to mitigate or eliminate voltage transients. This physical capacitor may be an expensive component of the inverter. For example in some systems without a communication access network, an inverter may include a physical capacitor having a large capacitance. Because current is proportional to capacitance, this large capacitance helps to reduce and stiffen any change in voltage with respect to time, that is, the large capacitance helps to reduce voltage ripple and/or current ripple on the DC bus.

However, according to example embodiments, because the observer 105 is able to set a virtual, or active, capacitance based on input from feedforward data, a size of the physical capacitor may be reduced relative to a conventional hybrid electric vehicle.

For example, the observer 105 may be able to provide an estimate of a change in voltage with respect to time. The inverter 110 may issue a current command, in response to a value of the estimate of the change in voltage with respect to time, to mitigate or reduce any transient change in voltages. This reduction helps to stiffen the DC link voltage, that is, helps to reduce voltage ripple and/or current ripple on the DC bus. This reduction is achieved by means of an effective virtual capacitance, and hence the hybrid electric vehicle requires a reduced physical capacitance to mitigate voltage transients.

Still referring to FIG. 1, the inverter 110 may be configured as an AC-DC converter to convert three-phase AC power from the generator 103 into DC power for the DC bus 175.

The inverters 110, 111, 112, 113, 114 may be controlled by a generator processing system (not shown), which may include gate drivers and an analog-to-digital converter (ADC), a processing device coupled electrically to the gate drivers, and a memory coupled electrically to the processing device and having stored therein operating instructions for the processing device.

The inverters 110, 111, 112, 113, 114 may include switching semiconductors (e.g., insulated gate bipolar transistors (IGBT) or other power transistors, including but not limited to, a Metal-Oxide Semiconductor Field-Effect Transistor (MOSFET), a Silicon Carbide MOSFET or a Silicon Carbide IGBT).

Each transistor may be coupled electrically to a respective gate driver that is dedicated to that transistor and may provide a low DC voltage (e.g., 24 VDC) to turn on and off that transistor. The gate drivers are under the control of the processing device, which may employ a pulse-width-modulation control scheme to control those gate drivers to supply electric energy on the DC bus in a generating mode of the generator 103

In an example embodiment, the generator 103 may have a traction device (not shown). The traction device may have three phase windings a2, b2 and c2. The inverter 104 may be coupled electrically between the traction device and the DC bus 175.

The first inverter 110 and the plurality of inverters 111, 112, 113, 114 may be configured, for example, as a DC-AC inverter to convert DC power from the DC bus 175 into three-phase AC power for other traction devices, and vice versa.

As used in this document, switch states indicate whether a properly functioning or unimpaired semiconductor device is active ("on" or "closed") or inactive ("off" or "open"). A failure of a semiconductor device to change states may result in a semiconductor device failing in an open state or a closed state, for example.

The first inverter 110 and the plurality of inverters 111, 112, 113, 114 may be controlled by a motor processing system (not shown). The motor processing system may include gate drivers and an analog-to-digital converter (ADC), a processing device coupled electrically to the gate drivers, and a memory coupled electrically to the processing device and having stored therein, operating instructions for the processing device.

The processing system may include gate drivers and an analog-to-digital converter (ADC), a processing device coupled electrically to the gate drivers, a memory coupled electrically to the processing device and having stored therein, operating instructions for the processing device.

The first inverter 110 and the plurality of inverters 111, 112, 113, 114 may include switching semiconductors (e.g., insulated gate bipolar transistors (IGBT) or other power transistors, including but not limited to, a Metal-Oxide Semiconductor Field-Effect Transistor (MOSFET), a Silicon Carbide MOSFET or a Silicon Carbide IGBT).

The transistors of the first inverter 110 and the plurality of inverters 110, 111, 112, 113, 114 may be coupled electrically to a respective gate driver that is dedicated to that transistor and may provide a low DC voltage (e.g., 24 VDC) to turn on and off that transistor. The gate drivers are under the control of the processing device, which may employ a pulse-width-modulation control scheme to control those gate drivers to supply electric energy on the DC bus 175 in the generating mode of the traction devices and remove electric energy from the DC bus 175 in the motoring mode of the traction devices.

Figure 2:
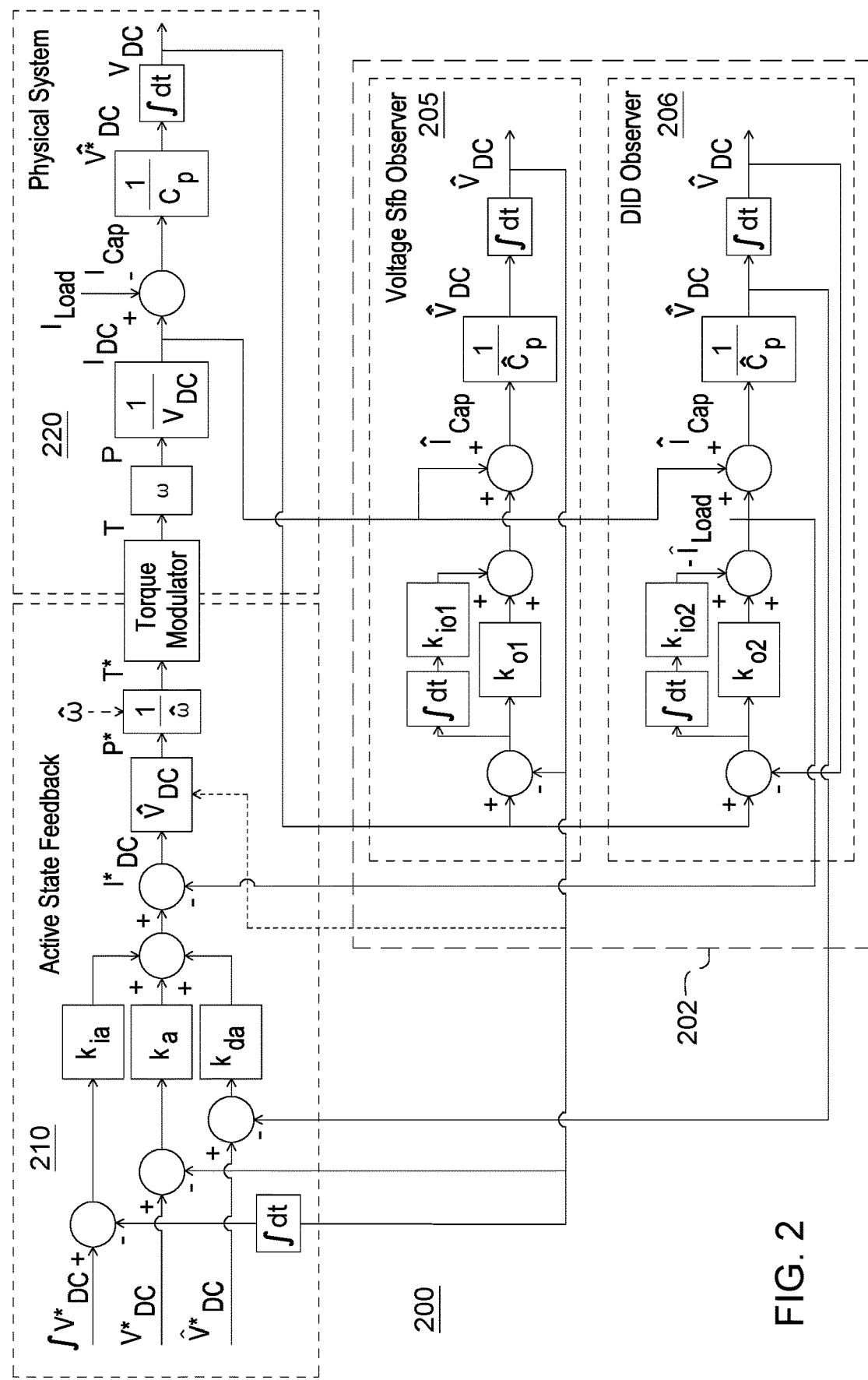

FIG. 2 illustrates a state diagram of the hybrid electric vehicle 100, according to example embodiments.

A method of performing voltage control is by using the mechanical and electrical equations (1), (2), and (3), where V* is the voltage command and kA is the active conductance (state feedback gain), and I*, P*, and T* are the current, power and torque commands derived from the voltage command and V and ω are the measured DC bus voltage and machine speed.

$$I^* = V^* k_A \tag{1}$$

$$P^* = V I^* \tag{2}$$

$$T^* = P^* \omega \tag{3}$$

Conventionally, there are several challenges related to achieving adequate voltage control performance to sustain a dynamic load. First, the bandwidth of the voltage control state feedback can be limited. Power modules are designed to operate only within a specific rate of switching frequencies. In some inverters this range is 1 kHz to 20 kHz. To attain stability, control loops should be tuned to bandwidths an order of magnitude lower than the operational switching frequency. To make up for this state feedback bandwidth limitation a feedforward term is used in the control. If the power electronics associated with the motor have received a torque command, this command can also be passed to the power electronics associated with the generator. This feedforward effectively increases the bandwidth of the voltage controller. This, however, is often complicated by the power electronics connected to the generator not being local to the power electronics connected to the motor. To accommodate this, a communication pathway between the two inverters is often necessary. This additional communication adds cost and reduces the reliability of the system.

According to example embodiments of inventive concepts, both the voltage control bandwidth and voltage sensor accuracy/noise challenges can be mitigated through the use of an observer. A Luenberger-style observer can be used to provide a no-lag or reduced-lag filtered version of the DC bus voltage. Such an observer also provides a disturbance estimate, which has the potential to eliminate the need for the additional communication path between inverters when used for disturbance input decoupling.

The observer estimate of the DC bus voltage can be formed by modeling the electrical system, as in equation (4), where $\hat{C}p$ is the estimate of the DC bus capacitor and ICap is the current flowing into the DC bus capacitor.

$$\hat{V} = 1\hat{C}pICapdt \tag{4}$$

Referring to FIG. 2, a state diagram 200 includes an active state feedback portion 210, a physical system portion 220, and an observer 202. The observer 202 includes a voltage state feedback observer 205 and a disturbance input decoupling (DID) observer 206.

Both the voltage state feedback observer 205 and the DID observer 206 are capable of estimating the DC bus voltage and load current disturbance. The existence of two observers allows for independent tuning and thus different bandwidths on the voltage and disturbance estimation. The voltage estimate is used for state feedback control and the disturbance estimate may be used for disturbance input decoupling. The voltage state feedback observer 205 and the DID observer 206 also produce an estimate of the derivative of the voltage, which is used for state feedback. This derivative feedback could come from either the voltage state feedback observer 205 or the DID observer 206, or from a third observer could be added to provide yet another degree of bandwidth adjustment.

The state feedback controller can be tuned to provide desirable system characteristics. In order to tune this system, the characteristic equation must be derived. Ignoring observer dynamics, measurement errors, and parameter estimation accuracy, the system transfer function can be formulated as equation (5) and the dynamic stiffness (disturbance rejection) of this system as in equation (6).

$$\frac{V^*_{DC}(s)}{V_{DC}(s)} = \frac{k_{da}s^2 + k_a s + k_{ia}}{c_p s^2 + k_{da}s^2 + k_a s + k_{ia}} \tag{1}$$

$$\left|\frac{I_{Load}(s)}{V_{DC}(s)}\right| = \frac{2}{C_p s^2 + k_{da}s^2 + k_a s + k_{ia}} = \frac{s^2}{(C_p + k_{da})s^2 + k_a s + k_{ia}} \tag{2}$$

From the characteristic equation of this system, equation (7), the relationship between the chosen eigenvalues and the state feedback gains, equations (8) and (9), can be determined, where s1 and s2 are the eigenvalues and kda, ka, and kia are the state feedback gains for active capacitance, active conductance, and active susceptance, respectively.

$$(C_p + k_{da})s^2 + k_a s + k_{ia} = 0 \tag{3}$$

$$s_1 + s_2 = \frac{k_a}{C_p + k_{da}} \tag{4}$$

$$s_1 s_2 = \frac{k_{ia}}{C_p + k_{da}} \tag{5}$$

The values chosen for the variables in equations (7), (8), and (9) will be dependent on system requirements. In an example embodiment, the torque (current) modulator is assumed to have a bandwidth of 100 Hz. To avoid resonance, the voltage controller eigenvalues in an example embodiment may be at 1 Hz and 10 Hz. Solving equation (8) and (9) for the state feedback gains yields equations (10), (11), and (12), where Ca is the active capacitance chosen for the system. The active capacitance for this system was chosen to be twice the expected capacitance in the physical system.

$$k_{da} = C_a \tag{6}$$

$$k_a = (s_1 + s_2)(C_p + k_{da}) \tag{7}$$

$$k_{ia} = (s_1 s_2)(C_p + k_{da}) \tag{8}$$

Replacing physical capacitance with active capacitance provides a large benefit as the physical capacitor in an inverter is typically a high cost component. It should be noted, however, that the addition of active capacitance requires feedback of the derivative of the DC bus voltage; this feedback is not typically available through a sensor, but can be readily obtained from a DC bus voltage observer. The addition of a DC bus voltage observer 202 to the system provides estimates of the DC bus voltage, the derivative of this voltage, and disturbances seen by the system. The feedforward term is estimated based on phase current measurements.

Another benefit of the observer is the voltage derivative estimate that it provides. This estimate can be used in the state feedback controller to eliminate the virtual-zero reference on this state. Without a voltage observer an estimate (or measurement) for this state is typically unavailable. The additional reference for the voltage derivative state extends the command vector and the state feedback controller bandwidth.

Because the observer estimated voltage has zero lag within or beyond the observer bandwidth, the observer estimated voltage can be used as the controller feedback in place of the measured voltage. An advantage of using the estimated voltage is the additional filtering provided by the limited observer bandwidth. Accordingly, noise present in a sensor may be filtered by the observer 202. The use of the estimation in this way may have little impact on the dynamic stiffness of the system within the normal operational range.

Disturbance estimation information may also be provided by the observer 202. Being able to estimate the disturbance and react to it quickly using disturbance input decoupling (DID) results in significant system performance improvements. Analysis of the state block diagram yields a disturbance estimation transfer function.

The accuracy of any sensors or parameters used to determine the feedforward term for the observer affects the accuracy of the disturbance estimate. Inaccuracies in the feedforward term may show up as scale factors or offsets in the disturbance estimate. Observer parameter estimates may be another source of error in disturbance estimation. These errors may affect the estimation accuracy even within the bandwidth. Since the disturbance estimate has no feedforward term for estimating because the feedforward term is only for estimation of the voltage and derivative of the voltage states, the disturbance estimate may have limited bandwidth and behaves like a state filter. Multiple, differently tuned observers may be used in a single system to provide different filtering and stiffness properties to for different estimates. In most systems, the observer used to estimate the disturbance is tuned to a higher bandwidth than the state estimation observers because of their roll-off at higher frequencies. State estimation observers may be tuned lower to make use of their zero-lag filtering properties.

The resulting dynamic stiffness provided by adding the inverted disturbance estimate to the state feedback controller output provides immediate response to disturbances alleviates the state feedback controller from needing to compensation for the disturbance. With disturbance input decoupling (DID) in place the state feedback controller contends with parameter estimate inaccuracies and command tracking. Even in the presence of parameter inaccuracy, DID may enhance the controller.

Figure 3:
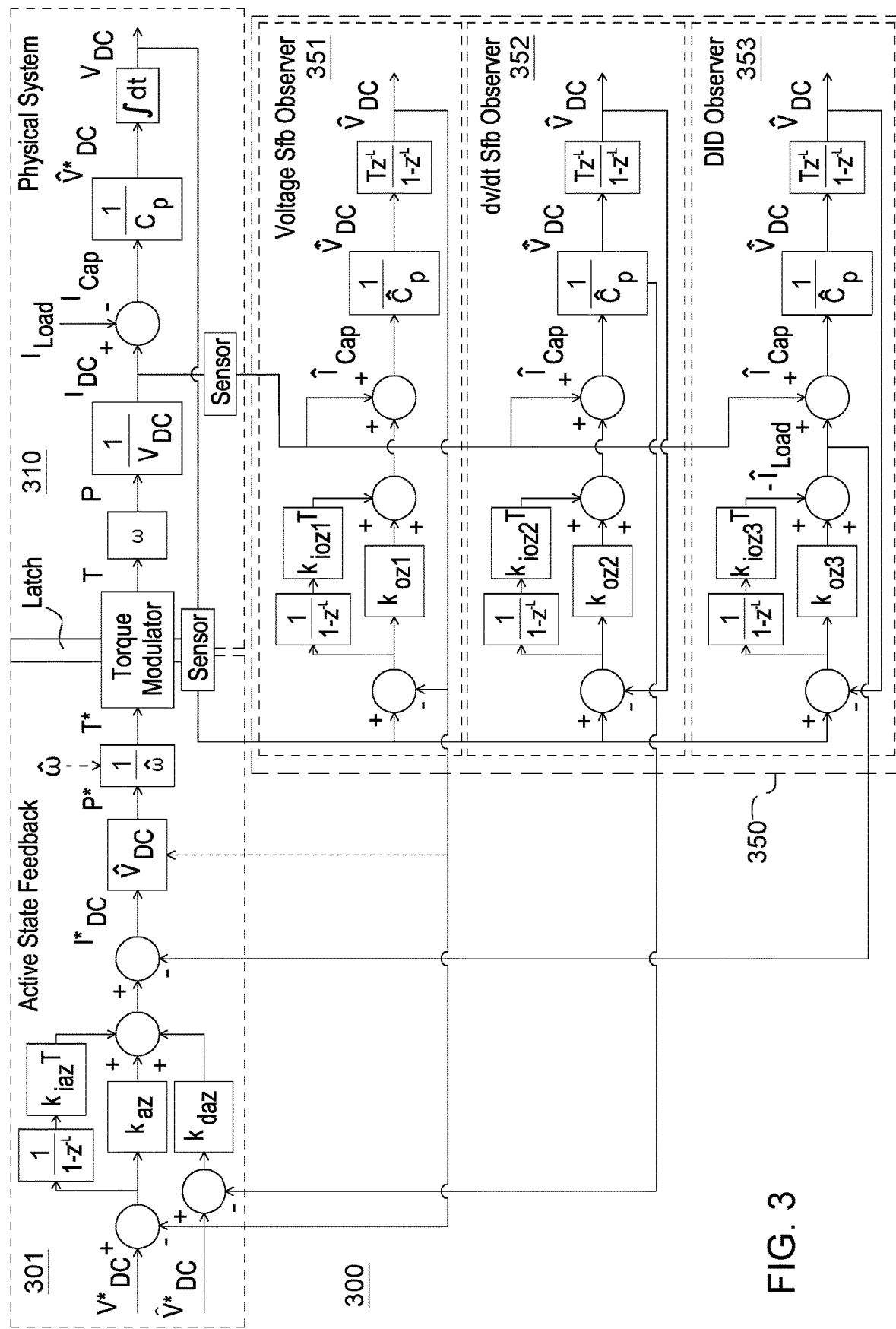

FIG. 3 illustrates a voltage controller and observer topology, according to example embodiments.

An example embodiment includes the controller topology 300 shown in FIG. 3, which includes a state feedback controller 301, a physical system 310, and a DC bus voltage observer 350, including one voltage estimation observer 351, one derivative estimation observer 352, and one in disturbance estimation observer 353.

When a step disturbance is applied to the system the state feedback control acts to compensate for the disturbance.

Using the observer voltage estimate instead of the measured voltage (with noise) for the state feedback controller reduces the roughness of the control and provides some smoothing of the inner loop command. This smoothing may be increased by decreasing the observer bandwidth. As long as the observer parameter estimate is reasonably accurate, this provides additional zero-lag filtering without effecting estimation accuracy.

Referring back to FIG. 2, the DC bus voltage observer 350 may include the derivative estimation observer 352, which provides an estimate of the derivate of the DC bus voltage with respect to time. The availability of this estimate allows the estimate to be used in state feedback control, thus eliminating the virtual-zero reference for this state.

Using the disturbance estimate for disturbance input decoupling has a very significant impact on the disturbance rejection properties of the system. This addition reduces the large step impact to near insignificant levels. Disturbance estimate cancels the entire disturbance very quickly. With DID enabled, the state feedback controller is alleviated from needing to react to disturbances; needing only to account for estimation errors and tolerances in the system.

The example embodiment of the state feedback controller in conjunction with three observers has demonstrated the system's performance. The state feedback controller tracks command trajectories with varying effectiveness, based on the frequency content of the trajectories. The controller is improved at higher frequencies by the addition of the dv/dt reference, feedback provided by the dv/dt estimation observer, and the active capacitance term. The voltage observers are able to accurately track the measured voltage with near zero, or zero, lag and can act as a filtered version of the measured signal. Additionally, the disturbance estimation observer generates an estimate that can be used to nullify the disturbances seen by the system.

Although only two observers are illustrated in FIG. 2, example embodiments are not limited thereto. For example, utilizing three independent observers allows for different tuning to give different properties to each estimate. Tuning the dv/dt estimate to a low bandwidth eliminates the noise that can be present in the measured signal while still providing an estimate of a previously unavailable state. Tuning the voltage estimate to a mid-range bandwidth enables measurement noise rejection. Finally, tuning the disturbance estimate to a high bandwidth enables fast estimation and nullification.

Figure 4:
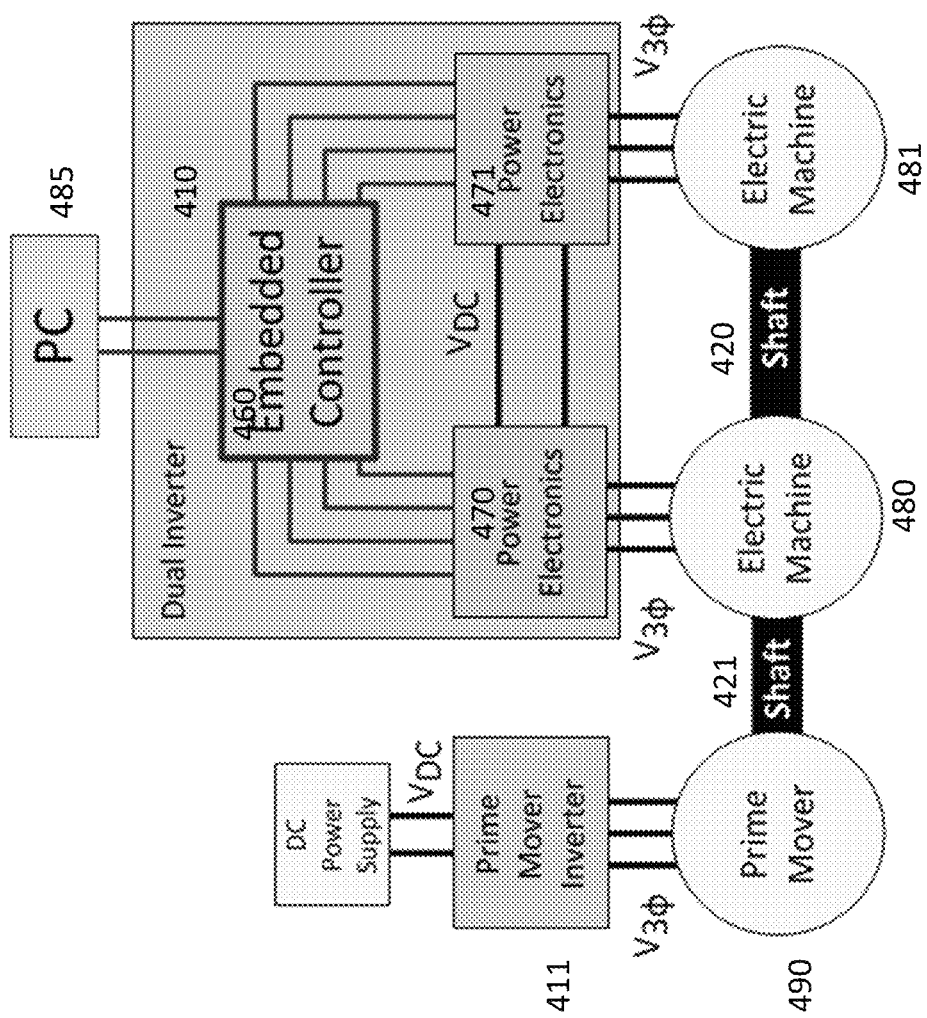

FIG. 4 illustrates a series hybrid electric vehicle topology, according to example embodiments.

Referring to FIG. 4, example embodiments of the state feedback voltage controller include an embedded controller 460, first power electronics hardware 470, second power electronics hardware 471, and a plurality of electric machines 480, 481 to load the system.

Referring to the example embodiment shown in FIG. 4, a dual inverter 410 contained in the embedded controller 430 allows independent controls of two electric machines 480, 481 through power electronics hardware 470, 471. These electric machines 480, 481 are coupled through a mechanical shaft 420. These electric machines 480, 481 are also coupled through a mechanical shaft 421 to a third electric machine, a prime mover 490. The prime mover 490 is controlled through an additional inverter 411 and, the purpose of the prime mover 490 is to provide a constant speed to the coupled electric machines 480, 481. The embedded controller 430 in a dual inverter 410 uses one side of the dual inverter 410 to execute the state feedback voltage controller with the objective of maintaining a steady DC bus voltage on the DC bus 475. The other side of the dual inverter 410 uses the provided DC bus voltage to apply torque to the constant speed mechanical shaft 420; this side of the dual inverter 410 loads (and act as a disturbance) for the DC bus state feedback voltage controller. A PC 485 connected to the embedded controller allows issuance of commands to the hybrid electric vehicle, setup various operating points, and collect the data presented in the subsequent sections.

Figure 5:
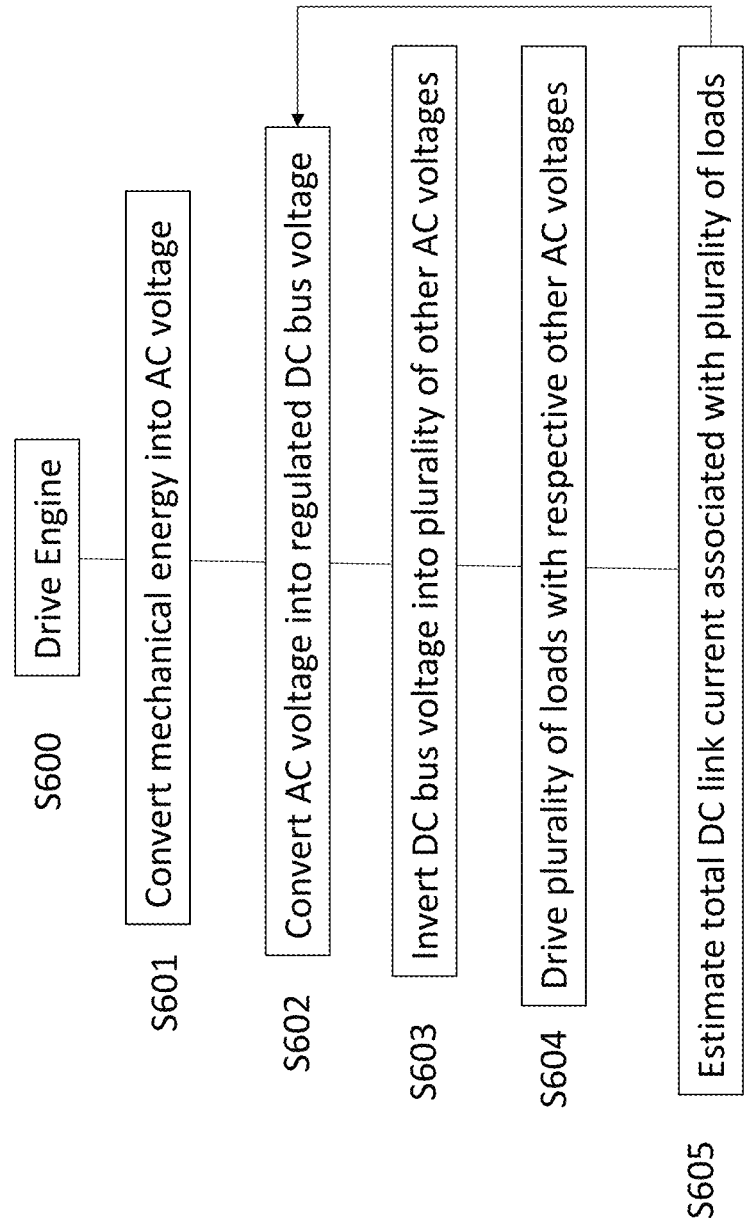

FIG. 5 illustrates an example method of operating a hybrid electric vehicle, according to some example embodiments.

Referring to FIG. 5, an engine is driven to generate mechanical energy (S600).

The mechanical energy is converted into an AC voltage (S601).

The AC voltage is converted into a bus voltage on a DC bus (S602). The AC voltage is converted into the bus voltage with a first inverter.

The DC bus voltage is inverted into a plurality of other AC voltages (S603).

The plurality of other AC voltages drives a plurality of motors. The plurality of motors drives a plurality of loads (S604).

A total DC link load current associated with the plurality of loads is estimated (S605). A total power associated with a plurality of loads is estimated, using the DC link load current and at least one of a measured and an estimated DC bus voltage. An observer determines the above estimates. For example, an observer such as the observer 105, described in more detail with reference to FIGS. 1-4, may estimate the power associated with loads on the hybrid electric vehicle 100. There may be no information fed forward from the respective plurality of loads or other inverters to the first inverter.

The DC bus voltage is regulated based on the estimated total load power (S606). By regulating the DC bus voltage based on the estimated total load power, the hybrid electric vehicle may have improved performance. By regulating the DC bus voltage based on the estimated total power provided by the observer, no direct communication is required from the plurality of loads to the first inverter.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

What is claimed is:

1. A method of operating a hybrid electric vehicle, the method comprising:
    driving an engine to generate mechanical energy;
    converting the mechanical energy into a first AC voltage;
    estimating a total DC link load current associated with a respective plurality of loads on the hybrid electric vehicle;
    converting, with a first converter, the first AC voltage into a DC bus voltage by regulating the DC bus voltage based on the total DC link load current;
    inverting, with a respective plurality of inverters, the DC bus voltage into a respective plurality of other AC voltages to drive the respective plurality of loads on the hybrid electric vehicle;
    estimating a change in the DC bus voltage with respect to time;
    controlling, with a current command, the total DC link load current based on an estimated change in the DC bus voltage with respect to time; and
    reducing the change in the DC bus voltage with respect to time based on the current command.

2. The method of claim 1, wherein the estimating of the total DC link load current includes,
    estimating the total DC link load current associated with the respective plurality of loads without estimating the total DC link load current based on information associated with the respective plurality of loads fed forward from each of the respective plurality of inverters to the first converter.

3. The method of claim 1, further comprising:
    at least one of,
        measuring the DC bus voltage to determine a measured DC bus voltage, or
        estimating the DC bus voltage to determine an estimated DC bus voltage.

4. The method of claim 3, further comprising:
    estimating a total power of the hybrid electric vehicle based on an estimated total DC link load current and at least one of the measured DC bus voltage or the estimated DC bus voltage; and
    wherein the regulating the DC bus voltage includes,
        regulating the DC bus voltage based on the total power.

5. The method of claim 1, wherein at least one of the first AC voltage or the respective plurality of other AC voltages includes,
    a three-phase voltage.

6. The method of claim 5, wherein the estimating an estimated total DC link load current includes,
    estimating the total DC link load current based on a measured first AC current, a measured second AC current, and a measured third AC current,
    wherein each of the measured first AC current, the measured second AC current, and the measured third AC current correspond to the first AC voltage.

7. The method of claim 1, wherein the inverting the DC bus voltage into the respective plurality of other AC voltages includes,
    driving a wheel on the hybrid electric vehicle.

8. The method of claim 1, wherein the inverting the DC bus voltage into the respective plurality of other AC voltages includes,
    driving a trailer assist attached to the hybrid electric vehicle.

9. A hybrid electric vehicle comprising:
    an engine configured to generate mechanical energy;
    a generator configured to convert the mechanical energy into a first AC voltage;
    a first converter configured to convert the first AC voltage into a DC bus voltage;
    a plurality of inverters configured to invert the DC bus voltage into a respective plurality of other AC voltages;
    a respective plurality of motors configured to convert the respective plurality of other AC voltages to drive a respective plurality of loads; and
    an observer to estimate a total DC link load current associated with the respective plurality of loads,
    wherein the first converter is configured to regulate the DC bus voltage based on the total DC link load current, and
    wherein the observer is configured to,
        estimate a change in the DC bus voltage with respect to time,
        control, with a current command, the total DC link load current based on an estimated change in the DC bus voltage with respect to time, and
        reduce the change in the DC bus voltage with respect to time based on the current command.

10. The hybrid electric vehicle of claim 9, wherein the observer is further configured to estimate a total power associated with the respective plurality of loads.

11. The hybrid electric vehicle of claim 9, wherein the respective plurality of loads includes a wheel.

12. The hybrid electric vehicle of claim 9, wherein the respective plurality of loads includes a trailer assist.

13. The hybrid electric vehicle of claim 9, wherein each of the plurality of inverters are not connected to the first converter by a communication network.

14. An inverter-observer for a hybrid electric vehicle, the inverter-observer comprising:
    a voltage controller configured to regulate a DC bus voltage based on a total load power associated with a plurality of loads on the hybrid electric vehicle;
    a memory configured to store non-transitory computer readable instructions; and
    a processor configured to execute the non-transitory computer readable instructions stored in the memory to,
        receive an estimated first link current associated with a generator of the hybrid electric vehicle,
        estimate a total DC link load current associated with the plurality of loads on the hybrid electric vehicle,
        determine the total load power associated with the plurality of loads on the hybrid electric vehicle,
        estimate a change in the DC bus voltage with respect to time, control, with a current command, the total DC link load current based on an estimated change in the DC bus voltage with respect to time, and reduce the change in the DC bus voltage with respect to time based on the current command.

15. The inverter-observer of claim 14, wherein the processor is further configured to, estimate the total load power based on an estimated total DC link load current and at least one of an estimated DC bus voltage or a measured voltage associated with a regulated DC bus voltage, the total load power being associated with the plurality of loads on the hybrid electric vehicle, and wherein the voltage controller is configured regulate the DC bus voltage based on the total load power.

16. The inverter-observer of claim 15, wherein the voltage controller is configured to regulate the DC bus voltage to drive a farm equipment.

17. The inverter-observer of claim 14, wherein the processor is configured to execute the non-transitory computer readable instructions to estimate an estimated total DC link load current based on a measured first AC current, a measured second AC current, and a measured third AC current, each of the measured first AC current, the measured second AC current, and the measured third AC current being associated with the generator on the hybrid electric vehicle.

18. The inverter-observer of claim 14, wherein the processor is configured to execute the non-transitory computer readable instructions to determine the total load power based on at least one of primary feedforward data or secondary feedforward data, wherein, depending on an inductance of a load associated with the inverter-observer, the primary feedforward data includes at least one of, (i) a measured DC link voltage associated with the hybrid electric vehicle, (ii) an estimated DC link voltage associated with the hybrid electric vehicle, (iii) a time derivative of the measured DC link voltage associated with the hybrid electric vehicle, (iv) a time derivative of the estimated DC link voltage associated with the hybrid electric vehicle, (v) an observed DC link current associated with the hybrid electric vehicle, or (vi) an estimated DC link current associated with the hybrid electric vehicle, and the secondary feedforward data includes at least one of, (i) observed torque associated with the hybrid electric vehicle, or (ii) commanded torque associated with the hybrid electric vehicle.

\* \* \* \* \*